April 23, 1968   J. L. HOLLINGER   3,379,907
BRAKE MECHANISM FOR SMALL INDUCTION MOTORS
Filed March 15, 1966   2 Sheets-Sheet 1

INVENTOR
JOHN L. HOLLINGER
BY
ATTORNEY

April 23, 1968      J. L. HOLLINGER      3,379,907

BRAKE MECHANISM FOR SMALL INDUCTION MOTORS

Filed March 15, 1966      2 Sheets-Sheet 2

3,379,907
BRAKE MECHANISM FOR SMALL
INDUCTION MOTORS
John L. Hollinger, Binghamton, N.Y., assignor to Endicott Coil Company, Inc., Binghamton, N.Y., a corporation of New York
Filed Mar. 15, 1966, Ser. No. 534,349
1 Claim. (Cl. 310—77)

This invention relates to brake mechanisms, particularly designed for small induction motors, for the purpose of automatically arresting the rotation of the rotor element when the motor is de-energized and, conversely, automatically releasing the braking action upon energizing of the motor.

Small induction motors are widely used in industry where power requirements are relatively small and thus the economy of construction of such motors a distinct advantage.

The most commonly used motors have a U-shaped, laminated, rectangular frame stator carrying a field coil and extending into curved pole pieces which accommodate the rotor element between them. The latter consists of a laminated core having peripheral slots accommodating copper bars, the ends of which are solidly connected to copper end rings, thus forming a closed circuit. By virtue of its appearance, this type of construction is generally referred to in engineering parlance as a "squirrel cage" rotor. In order to achieve a starting torque, such motors have on one pole piece of the stator a single turn, short-circuited winding called a "shading coil." The current induced in the shading coil produces a flux which has a phase difference of 90° and thus a starting torque will be initiated by the induced rotor current.

In motors of the above-described construction, when the current to the field coil is interrupted for the purpose of stopping the motor, the momentum of the rotor will cause continued rotation for several revolutions or fractions thereof. While this is of no consequence in certain applications of the motor, such as fans or household appliances, it is a serious drawback in other applications which require instant stopping, for example, in counters, timing devices, etc.

Attempts have been made to ameliorate this condition by applying a brake to the freely turning rotor at the instant the current is turned off. In some instances such braking action uses electrodynamic means coupled to the rotor or mechanical means directly engaging the rotor. However, none of the prior art devices is capable of achieving stopping of the rotor substantially instantly or without undesirable shock due to sudden impact.

It is accordingly the primary object of this invention to improve the braking action and provide a brake mechanism for motors of the type described which will be set into operation upon cessation of current flow in the stator winding and will apply force without impact.

It is a particular feature of the invention that the braking force is progressively increased by the tendency of the rotor to continue rotation and thus the kinetic energy accumulated by the rotor is dissipated at a faster rate.

Other objects and features will be apparent from the following description of the invention, pointed out in particularly in the appended claim, and taken in connection with the accompanying drawings in which:

Figure 1:
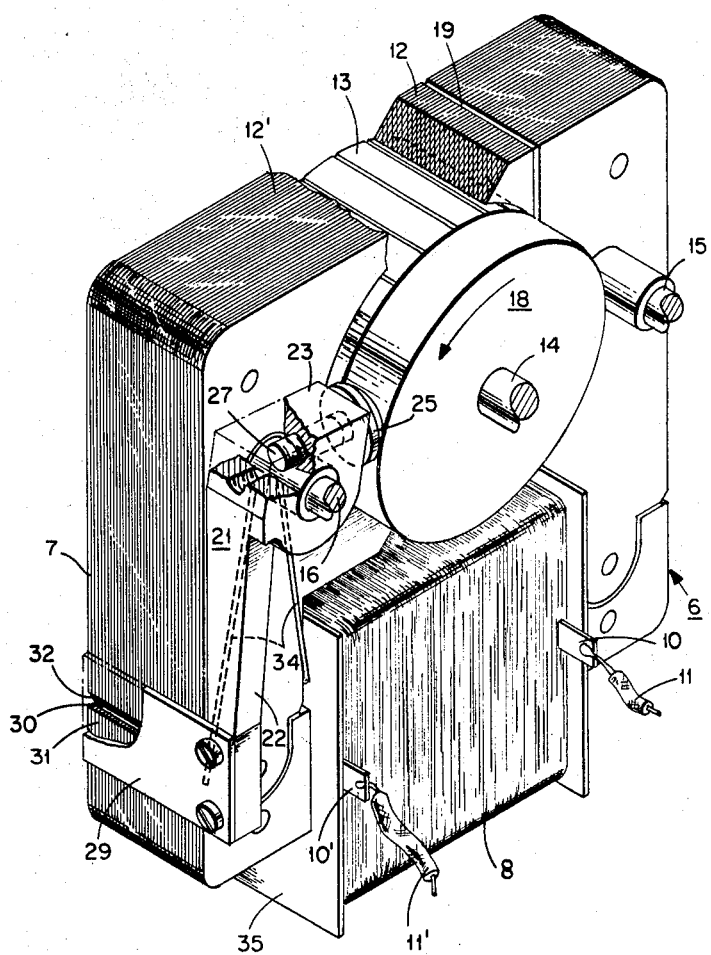
FIG. 1 is a rear elevational view, in perspective, of a shaded pole type motor illustrating the construction and application of the brake mechanism of this invention.

Referring to the figures, the motor 6 is of the conventional type consisting of a U-shaped stator 7 of laminated construction, the bottom portion of which carries the field coil 8. The lugs 10 and 10' serve as terminals of the winding of the coil 8 to which conductors 11 and 11' carry alternating current for excitation. The upper portion of the stator terminates in curved pole pieces 12 and 12' which surround the rotor 13, the shaft 14 of which is held in suitable bearings attached to the stator over studs such as 15 and 16. For the sake of clearer illustration of the brake mechanism, the rear bearing 17 is not shown in this view in FIG. 1 and the supporting studs 15 and 16 are cut away.

Attached to the rear end of the rotor is a circular disk 18 made of resilient material, such as rubber or plastic. The disk 18 serves as the brake engaging portion of the rotor 13. The bearing supported end of the shaft 14 is also cut away for convenience of illustration.

The pole piece 12 carries the shading ring 19, the placement of which determines the direction of rotation of the rotor which, as indicated by the arrows, is counterclockwise.

Figure 2:
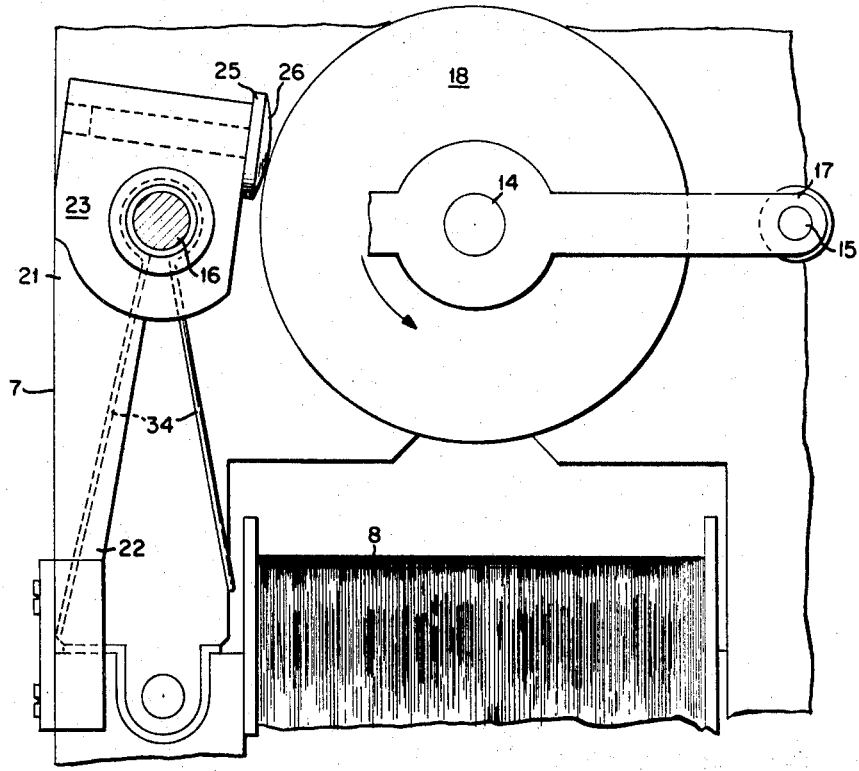
FIG. 2 is a partial view of the motor illustrating the positioning of the brake lever arm when the motor is energized.

The brake assembly comprises a lever arm 21 having a downwardly extending tail portion 22 and an upper head portion 23, the latter being pivotally supported over the stud 16. The head portion accommodates the brake shoe 25 which has a curved surface 26 and a stem 27 which is threaded for insertion into a similarly threaded opening in the head portion 23. The end of the tail portion 22 carries a ferromagnetic plate 29 which extends transversely over the stator 7. A portion of the plate 29 is cut away to show the gap 30 in the magnetic circuit of the stator 7 which creates secondary pole pieces 31 and 32, in order to assure sufficient magnetic flux for attraction and holding of the plate 29 against the stator 7 when the motor is energized. Thus the lever arm 21 is moved over the pivot stud 16 into position away from disk 18 as seen in FIG. 2.

The spring 34 is coiled around the stud 16, one leg bearing against the flange 35 of the coil 8 and the other leg against the inner surface of the plate 29. Thus the spring biases the lever arm 21 and provides a motive force for moving the arm into braking position when the plate 29 is no longer held by the magnetic force of the stator 7, namely, when the motor is de-energized, the current being cut off from the field coil 8. This condition is depicted in FIG. 3.

Figure 3:
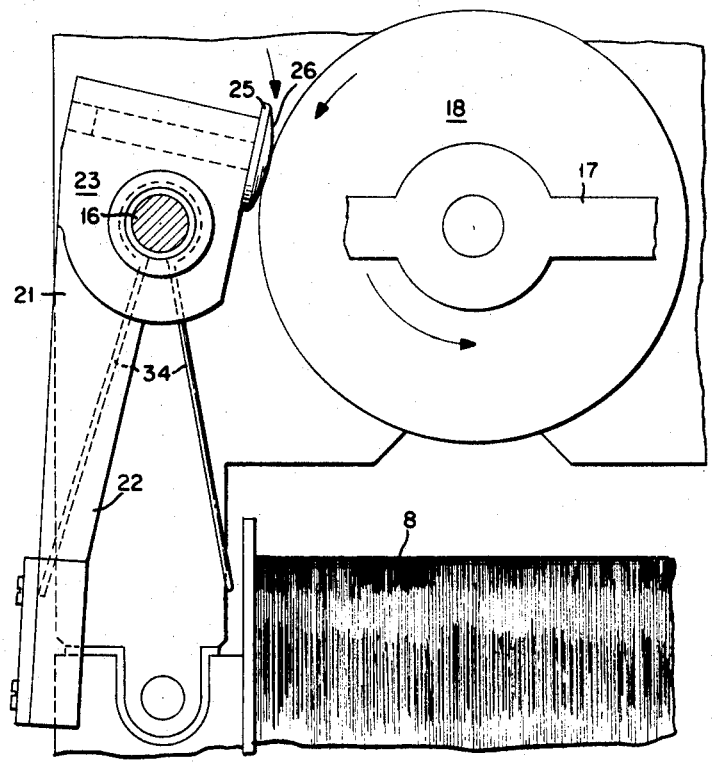
FIG. 3 is a similar view showing the lever arm in braking position, engaging the surface of a portion of the rotor when the motor is de-energized.

As seen in FIG. 3, the head portion 23 of the arm 21 is swung toward the rotor 13 so that the surface 26 of the brake shoe 25 engages the resilient surface of the disk 18. The curvilinear configuration of the shoe 25 and its offset position from the horizontal axis is a contributing factor in further constraining the lever arm 21 to move by the force of the momentum of rotor 13 against the resilient surface of the disk 18. In this manner a progressively greater force of engagement is produced than would be derived solely from the force of the spring 34. The kinetic energy of the momentum of the rotor 13 is thereby quickly dissipated, resulting in a substantially instant stopping of the rotor 13 after cessation of current in the coil 8.

The resilient surface of the disk 18 allows deformation by the pressure of the shoe 25 which is one of the salient factors in smooth braking action. While by way of example, only a slightly arcuate surface is shown for the shoe 25, other configurations may be chosen for modifying the braking action. A serrated surface or various angular forms will produce different stopping times as may be desired in certain applications.

I claim:
1. An automatic brake mechanism for small induction motors, particularly of the shaded pole type which, upon de-energizing the flux-producing winding, is automatically released and caused to engage a portion of the rotor, said mechanism comprising in combination:
  (a) a brake lever arm having a head portion carrying a brake shoe and a tail portion extending along the stator frame of said motor and terminating in a ferromagnetic plate,
  (b) a stud extending from said stator frame over which said brake lever is fulcrumed for movement of said head portion toward said rotor for engagement with a portion thereof,
  (c) a spring biasing said lever arm in a direction to cause movement of said arm upon expansion of said spring toward and into engagement of the brake shoe with said portion of the rotor,
  (d) said portion of the rotor comprising a disk of resilient material forming an extension of said rotor, the outer surface thereof facing said brake shoe,
  (e) a gap in said stator frame defining secondary magnetic pole pieces placed opposite said ferromagnetic plate for attracting said plate while said motor is energized, thereby holding said lever arm against the force of said spring in a position preventing said brake shoe from engagement with said resilient surface of said rotor portion and releasing said plate upon collapse of the magnetic field when said motor is de-energized, and
  (f) said brake shoe having such configuration and angular movement as to cause progressively greater force of engagement with the resilient surface of the rotor due to the kinetic energy of the momentum of said rotor, thereby effecting substantially instant stopping of said rotor.

References Cited

UNITED STATES PATENTS

| | | | |
|---|---|---|---|
| 2,025,264 | 12/1935 | Beam | 310—77 |
| 2,340,052 | 1/1944 | Grimes | 310—77 |
| 2,373,736 | 4/1945 | Arnot | 310—77 |
| 2,479,344 | 8/1949 | Goldfield. | |

FOREIGN PATENTS

| | | |
|---|---|---|
| 1,115,651 | 4/1956 | France. |
| 1,090,633 | 4/1955 | France. |
| 509,577 | 10/1955 | Netherlands. |

MILTON O. HIRSHFIELD, *Primary Examiner.*

J. D. MILLER, *Examiner.*